(12) United States Patent
Dickie et al.

(10) Patent No.: US 11,166,250 B2
(45) Date of Patent: Nov. 2, 2021

(54) TIME SYNCHRONIZATION OF DISTRIBUTED DEVICES

(71) Applicant: Rosemount Aerospace Inc., Burnsville, MN (US)

(72) Inventors: David F. Dickie, Granby, CT (US); Eric I. B. Richardson, Charlotte, VT (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 147 days.

(21) Appl. No.: 16/601,129

(22) Filed: Oct. 14, 2019

(65) Prior Publication Data

US 2021/0112512 A1 Apr. 15, 2021

(51) Int. Cl.
*H04W 56/00* (2009.01)
*H04J 3/06* (2006.01)
*H04L 7/00* (2006.01)

(52) U.S. Cl.
CPC ....... *H04W 56/0045* (2013.01); *H04J 3/0667* (2013.01); *H04J 3/0682* (2013.01); *H04L 7/0037* (2013.01); *H04L 7/0079* (2013.01); *H04W 56/005* (2013.01); *H04W 56/006* (2013.01); *H04W 56/0015* (2013.01); *H04W 56/0075* (2013.01)

(58) Field of Classification Search
CPC ...... H04J 3/0658; H04J 3/0667; H04J 3/0682; H04J 3/0638; H04L 7/0037; H04L 7/0079; H04L 12/40; H04L 7/0331; H04L 7/0039; H04W 56/001; H04W 56/0015; H04W 56/0045; H04W 56/005; H04W 56/006; H04W 56/007; H04W 56/0075; G06F 1/12
See application file for complete search history.

(56) References Cited

U.S. PATENT DOCUMENTS

| 4,005,266 | A | 1/1977 | Lehr et al. |
| 7,576,622 | B1 | 8/2009 | Samad |
| 7,778,173 | B2 * | 8/2010 | Tse ........................ H04L 7/0331 370/230.1 |
| 8,873,589 | B2 | 10/2014 | Aweya et al. |
| 9,596,073 | B1 | 3/2017 | Reyes et al. |

(Continued)

FOREIGN PATENT DOCUMENTS

WO WO2009083501 A2 7/2009

OTHER PUBLICATIONS

RS-485, Wikipedia, Jul. 24, 2019, 7 pages.

(Continued)

*Primary Examiner* — Kan Yuen

(74) *Attorney, Agent, or Firm* — Kinney & Lange, P.A.

(57) ABSTRACT

A method and system of synchronizing a local clock with a master clock using a serial communication bus includes receiving by a serial data interface receiver a master time signal corresponding to a master clock, generating by a frequency tuning loop a time error signal corresponding to a difference between the master time signal and a local time signal, generating by the frequency tuning loop an actual frequency signal based on a base frequency and the time error signal, producing by the frequency tuning loop a command frequency error based on the actual frequency signal and the local time signal, and producing by the local clock an updated local time signal based on the command frequency error.

20 Claims, 4 Drawing Sheets

(56) References Cited

U.S. PATENT DOCUMENTS

| | | |
|---|---|---|
| 10,165,537 B1 | 12/2018 | Zarubica et al. |
| 10,257,798 B1 | 4/2019 | Koelemeij et al. |
| 2004/0130484 A1* | 7/2004 | Krasner ............... G01S 19/235 342/357.62 |
| 2007/0026830 A1* | 2/2007 | Guilford ............. G01R 23/173 455/260 |
| 2018/0146443 A1* | 5/2018 | Park ................... H04L 43/0864 |

OTHER PUBLICATIONS

Precision Time Protocol, Wikipedia, Aug. 24, 2019, 8 pages.
John Edison, IEEE-1588 Standard for a Precision Clock Synchronization Protocol for Networked Measurement and Control Systems—A Tutorial, Oct. 10, 2005, 94 pages, Agilent Technologies, Inc.
Extended European Search Report dated Aug. 6, 2020, received for corresponding European Application No. 19216301.2, 9 pages.
Murat Akpmar, Klaus Werner Schmidt, ECE Guran Schmidt, Improved Clock Synchronization Algorithms for the Controller Area Network (CAN), Jul. 29, 2019, pp. 1-8.

\* cited by examiner

TIME SYNCHRONIZATION OF
DISTRIBUTED DEVICES

BACKGROUND

The present disclosure relates generally to electronic time-keeping, and in particular, to the time synchronization of distributed devices.

Events that are sensed, processed, recorded, or otherwise signaled are typically associated with a time of occurrence. Accordingly, distributed components typically include an internal electronic clock that is used for time-keeping, and for tagging events with a time of occurrence. Because there is an inherent drift in an electronic clock, the timing that is kept by various components can drift apart from each other. High-performance vehicles and structures can utilize a distributed system of sensors, processors, and other components that must be synchronized to a common time reference. Therefore, it is desirable to maintain highly-accurate time synchronization between distributed components in a system so that various events can be correlated relative to the common time reference, which can be referred to as a master clock. It is desirable to maintain time synchronization between distributed devices within 1 microsecond (1 μsec.) of each other. Some high-performance systems can require time synchronization that is better than (i.e., less than) 1 μsec.

Various electronic communication protocols can be used for transmitting time synchronization data to distributed devices. An aircraft is an exemplary platform that can include a number of distributed devices for sensing and/or processing various events. An aircraft environment can be susceptible to high levels of electronic noise (e.g., electromagnetic, radio frequency, static, lightning, electronic interference), which can present a design challenge for communications systems linking distributed devices. A serial data interface that uses differential signaling over a twisted-wire pair is an exemplary signal bus that can be used to link distributed devices in these exemplary harsh environments within an aircraft. Accordingly, there is a need for providing sub-microsecond time synchronization of distributed devices using a serial data interface.

SUMMARY

A method of synchronizing a local clock with a master clock using a serial communication bus includes receiving by a serial data interface receiver a master time signal corresponding to a master clock, generating by a frequency tuning loop a time error signal corresponding to a difference between the master time signal and a local time signal, generating by the frequency tuning loop an actual frequency signal based on a base frequency and the time error signal, producing by the frequency tuning loop a command frequency error based on the actual frequency signal and the local time signal, and producing by the local clock an updated local time signal based on the command frequency error.

A system for synchronizing a local clock with a master clock using a serial communication bus includes a serial data interface receiver configured to receive a master time signal corresponding to the master clock, a frequency tuning loop configured to generate a time error signal corresponding to a difference between the master time signal and a local time signal, generate an actual frequency signal based on a base frequency and the time error signal, produce a command frequency error based on the actual frequency signal and the local time signal, and produce an updated local time signal based on the command frequency error, whereby the updated local time signal is representative of the local clock.

A distributed device network includes a serial communication bus, a master controller, a master clock on the master controller, and one or more sub-controllers, each including a local clock, a serial data interface receiver configured to receive a master time signal corresponding to the master clock, a frequency tuning loop configured to generate a time error signal corresponding to a difference between the master time signal and a local time signal, generate an actual frequency signal based on a base frequency and the time error signal, produce a command frequency error based on the actual frequency signal and the local time signal, and produce an updated local time signal based on the command frequency error, whereby the updated local time signal is representative of the local clock.

DETAILED DESCRIPTION

Time synchronization of distributed electronic devices (i.e., distributed devices) is important to the integrity of data that is collected by, processed by, and/or transmitted by these devices. A description of the present disclosure will be made using a smart sensing system as an exemplary embodiment of a system of distributed devices. A smart sensing system (S3) is a family of sensing and processing line replaceable units (LRUs) that are intended to function as system building blocks that form a scalable digital sensing infrastructure for a prognostics and health management (PHM) system. By design, a smart sensing system can be highly-configurable by using LRUs. Accordingly, the smart sensing system can be tailored to accommodate a wide variety of PHM applications involving sensing, monitoring, and/or processing. An aircraft is an exemplary embodiment of a smart sensing system architecture that provides an overall PHM system by using a number of distributed nodes. Some of the nodes can be structural health monitoring nodes, each of which can contain various sensors. Non-limiting examples of sensors and parameters that can be monitored by an exemplary smart sensing system include stress, strain, and impact sensors throughout aircraft components, environmental and flight parameters measured by air data probes, gas turbine engine operating parameters, and radio frequency (RF), optical, magnetic, and acoustical signals measured by various sensors. A high-performance smart sensing system can require time synchronization accuracy between various components that is closer than 1 μsec. ($1 \times 10^{-6}$ seconds), while being able to communicate using a serial data bus architecture. An RS-485 bus is an exemplary serial data bus that can be used in an aircraft's architecture. In some embodiments, a system of distributed time-keeping devices can require time synchronization accuracy that is significantly better than 1 μsec. In some of these embodiments, the time synchronization accuracy requirement can be on the order of 100 nsec.

(1×10⁻⁷ seconds). In other of these embodiments, the time synchronization accuracy requirement can be on the order of 10 nsec. (1×10⁻⁸ seconds).

Figure 1:
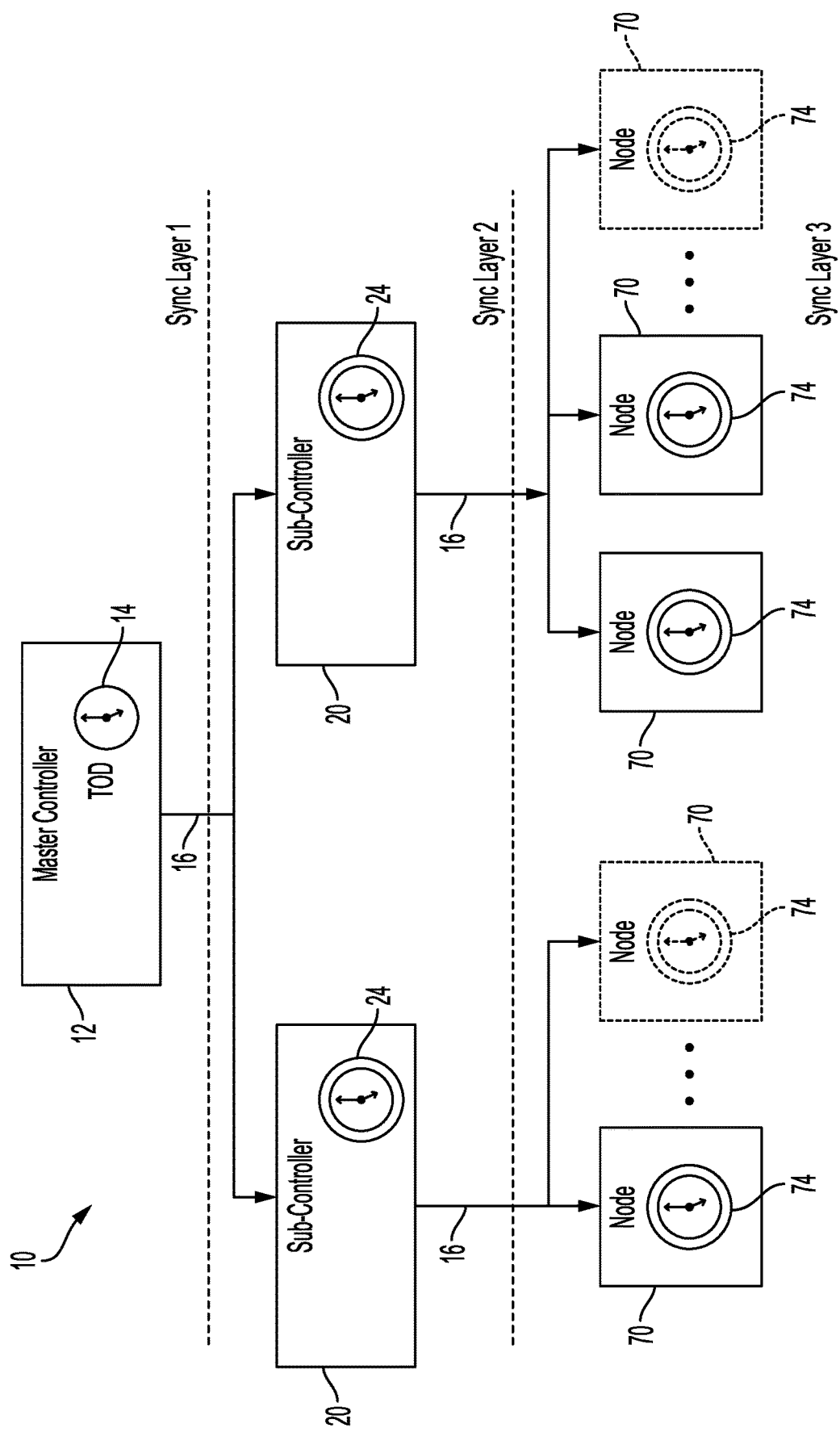
FIG. 1 is a schematic block diagram of a smart sensing system utilizing a precision time synchronization system with a serial data interface.

FIG. 1 is a schematic block diagram of a smart sensing system (S3) utilizing a precision time synchronization system with a serial data interface. Sync will be used to refer to synchronization in the present disclosure. Shown in FIG. 1 are smart sensing system 10, master controller 12, master clock 14, serial communication buses 16, sub-controller 20, sub-controller clock 24, node 70, and node clock 74. Master controller 12 includes master clock 14, which establishes the time reference for smart sensing system 10. Accordingly, master clock 14 provides the time of day (TOD) as a time synchronization reference for smart sensing system 10, and can be said to be in synchronization (sync) layer 1. Master clock 14 can include a stable precision oscillator that produces an output that is counted and translated into time of day. Master controller 12 can be referred to as a smart sensing system (S3) master controller, which provides time synchronization to one or more sub-controllers 20. Sub-controllers 20 can be referred to as smart sensing system (S3) controllers. Each sub-controller 20 includes sub-controller clock 24, and can be said to be in synchronization (sync) layer 2. Sub-controllers 20 are communicatively coupled to master controller 12 by serial communication bus 16. Accordingly, sub-controller clocks 24 are in time synchronization with master clock 14, as will be described later in regard to FIGS. 2-3. Sub-controllers 20 can also be described as being highly-configurable LRUs, because they can be added, removed, and/or relocated, simply requiring connections to serial communication buses 16. As will be described later in FIG. 4, smart sensing system 10 can account for changes that occur in the location of sub-controllers 20. It is to be appreciated that in most embodiments, electrical power connections to sub-controllers 20 are also required (not shown).

Under each sub-controller 20 are one or more nodes 70, each having an associated node clock 74. Sub-controllers 20 provide time synchronization to nodes 70, being communicatively coupled to each by serial data buses 16. Node clocks 74 are in time synchronization with associated sub-controller 20, and can be said to be in synchronization (sync) layer 3. Any number of sub-controllers 20 can be communicatively connected under master controller 12 via serial communication bus 16. Moreover, any number of nodes 70 can be connected under each sub-controller 20 via serial communication bus 16. Nodes 70 can also be described as being highly-configurable LRUs, because they can be added, removed, and/or relocated, simply requiring connections to serial communication buses 16. In some embodiments, smart sensing system 10 can include one or more sub-controllers 20, while omitting nodes 70 from any or all of each sub-controller 20.

Figure 2:
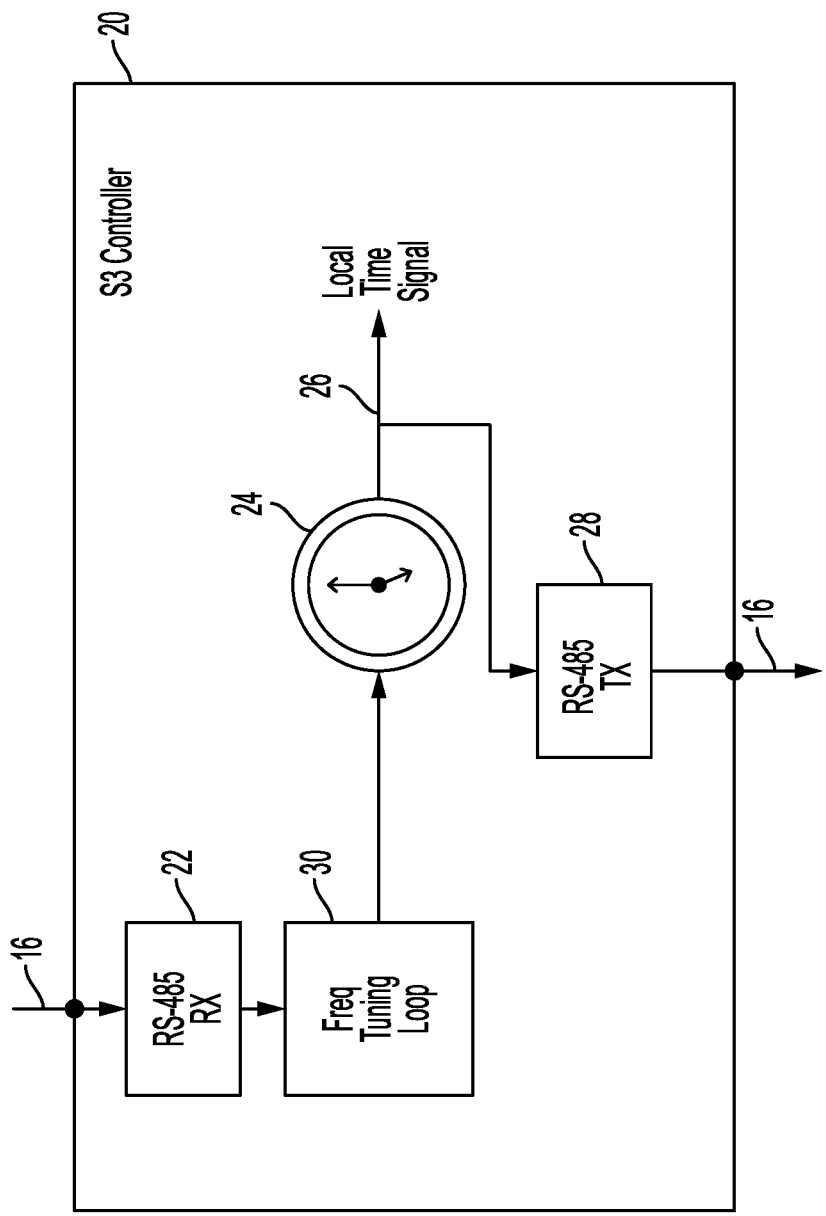
FIG. 2 is a schematic block diagram of a sub-controller in the smart sensing system shown in FIG. 1.

FIG. 2 is a schematic block diagram of sub-controller 20 in smart sensing system 10 shown in FIG. 1. Shown in FIG. 2 are serial communication buses 16, sub-controller 20, RS-485 receiver 22, sub-controller clock 24, sub-controller time signal 26, RS-485 transmitter 28, and frequency tuning loop 30. In the illustrated embodiment, serial communication buses 16 use the RS-485 standard for serial communications. The RS-485 standard is jointly published by the Telecommunications Industry Association and the Electronic Industries Alliance (TIA/EIA), and is therefore also known as the TIA-485 and EIA-485 standards. Accordingly, serial communication bus 16 can be referred to as an RS-485 bus. Sub-controller 20 receives serial time synchronization data via serial data bus 16 using RS-485 receiver 22. In the illustrated embodiment, serial communication bus 16 (i.e., RS-485 bus) uses differential signaling over a twisted wire pair, thereby providing a relatively high degree of signal integrity in an electrically-noisy environment. In other embodiments, serial communication bus 16 can use a serial interface standard that is different than RS-485. Other exemplary serial interface standards include RS-422, RS-232, controller area network (CAN), local interconnect network (LIN), optical link, and wireless communications protocol. Accordingly, in these other embodiments, RS-485 receiver 22 can be replaced by a suitable serial data bus receiver.

Referring again to FIG. 2, the time synchronization signal that is received via serial data bus 16 can be referred to as an input serial word that is used to provide time synchronization of sub-controller 20 (i.e., sub-controller) with master controller 12. The time synchronization signal (i.e., input serial word) is provided to frequency tuning loop 30, which maintains time-keeping accuracy of sub-controller clock 24. Frequency tuning loop 30 maintains the time synchronism of sub-controller clock 24 with respect to master clock 14, and will be described in more detail later in FIG. 3. Sub-controller clock 24 maintains and provides sub-controller time signal 26 for use by sub-controller 20, and for use by all nodes 70 that are subservient to sub-controller 20. Sub-controller time signal 26 can be referred to as a local time signal. Sub-controller time signal 26 is in time synchronism with master clock 14 (i.e., time of day) by the operation of a frequency tuning loop, as will be described later in FIG. 3. As described above in regard to FIG. 1, sub-controller 20 can provide time synchronism to one or more nodes 70. Therefore, sub-controller time signal 26 is also input to RS-485 transmitter 28 for transmission via serial data bus 16 to the subservient nodes. RS-485 transmitter 28 can be referred to as a serial data bus transmitter, which can use any other suitable serial data standard in various other embodiments. FIG. 2 depicts an exemplary embodiment of time synchronization between master controller 12 and a particular sub-controller 20 (i.e., between master clock 14 and a particular sub-controller clock 24). In the exemplary embodiment, master clock 14 can be referred to as a master clock, and sub-controller clock 24 can be referred to as a local clock. A similar system can provide time synchronization between a sub-controller 20 and a particular node 70 (i.e., between a sub-controller clock 24 and a node clock 74). Accordingly, in describing time synchronization between sub-controller clock 24 and node clock 74, sub-controller clock 24 can be referred to as a master clock, and node clock 74 can be referred to as a local clock.

Figure 3:
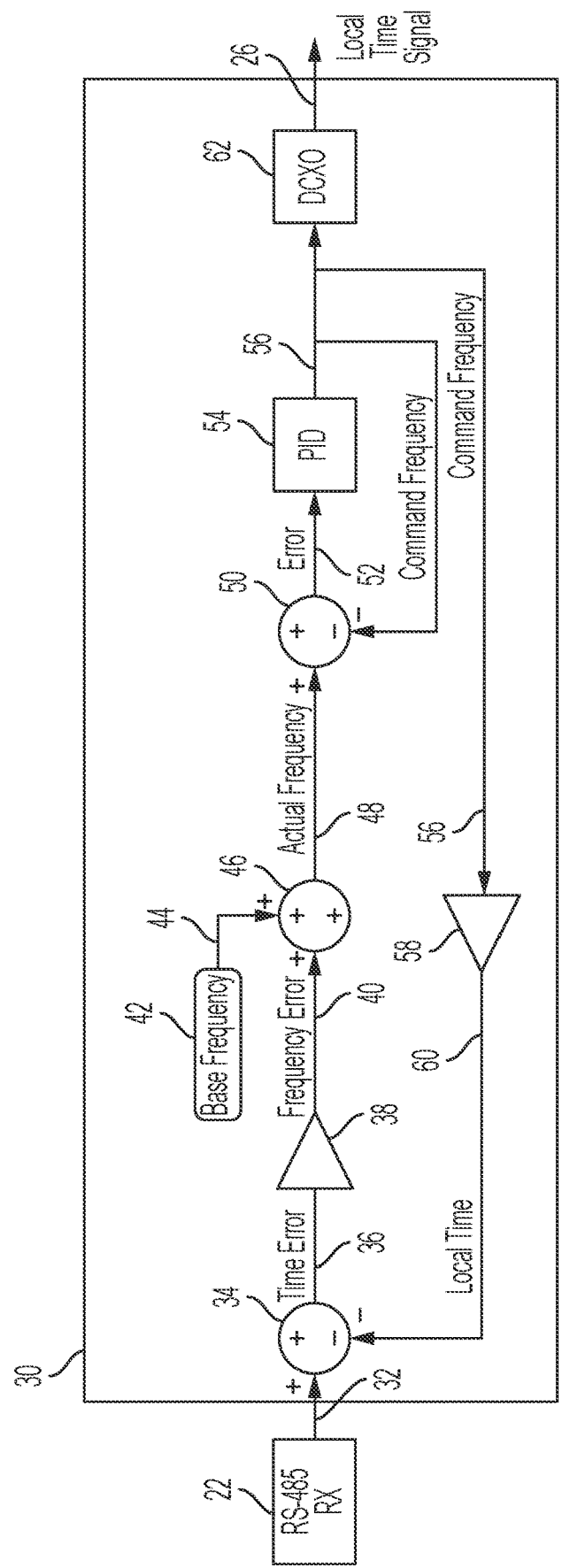
FIG. 3 is a schematic block diagram of a frequency tuning loop for the sub-controller shown in FIG. 2.

FIG. 3 is a schematic block diagram of frequency tuning loop 30 for sub-controller 20 shown in FIG. 2. Shown in FIG. 3 are RS-485 receiver 22, sub-controller time signal 26, frequency tuning loop 30, input serial word 32, input summing node 34, time error signal 36, time error amplifier 38, frequency error signal 40, base frequency 42, base frequency signal 44, frequency error summing node 46, actual frequency signal 48, command frequency summing node 50, command frequency error 52, proportional integral derivative (PID) controller 54, command frequency 56, command frequency amplifier 58, local time feedback signal 60, and digitally-controlled oscillator 62. RS-485 receiver 22 receives serial time synchronization data from master controller 12 via serial communication bus 16, producing input serial word 32 as described above in regard to FIG. 2. Master controller 12 includes a serial data bus transmitter (not shown) that transmits the time of day signal from master clock 14. Input serial word 32 (i.e., serial time synchronization signal) is compared against local time feedback signal 60 by input summing node 34 which evaluates a difference between input serial word 32 (i.e., representative of time of day) and local time feedback signal 60 (i.e., local time), thereby producing time error signal 36. Local time feedback signal 60 will be described in greater detail later. Time error signal 36 is processed by time error amplifier 38, thereby producing frequency error signal 40. In a manner similar to that of master clock 14, sub-controller clock 24 uses a precision oscillator that can be precisely controlled to maintain a precision a desired frequency. In the illustrated embodiment, digitally-controlled oscillator 62 is used as a controllable precision oscillator. Digitally-controlled oscillator 62 can be referred to as a digitally controlled crystal oscillator (DCXO). In other embodiments, a voltage controlled crystal oscillator (VCXO) can be used as a controllable precision oscillator. Digitally-controlled oscillator 62 produces sub-controller time signal 26. It is to be appreciated that additional circuit components (not shown in FIG. 3) are used for frequency counting to translate sub-controller time signal 26 into a local time signal (i.e., sub-controller clock 24).

Referring again to FIG. 3, base frequency 42 provides base frequency signal 44. Base frequency 42 can be referred to as base frequency reference value, or as a nominal reference frequency. In various embodiments, base frequency 42 can be implemented as a reference oscillator, and/or as a reference value. Base frequency signal 44 can be referred to as the nominal oscillator frequency (i.e., reference frequency). In the illustrated embodiment, base frequency 42 (i.e., and associated base frequency signal 44) can range from about 10-100 MHz. In some embodiments, base frequency 42 can range from about 1 MHz-1 GHz. In other embodiments, base frequency 42 can be less than 1 MHz or greater than 1 GHz. Frequency error signal 40 is combined with base frequency signal 44 by frequency error summing node 46, thereby producing actual frequency signal 48. In other words, frequency error signal 40, which represents time error signal 36, is added to base frequency signal 44 to calculate actual frequency signal 48 as being a frequency that will result in zero error between actual frequency signal 48 and master clock 14. Actual frequency signal 48 is compared against command frequency 56 by command frequency summing node 50, which evaluates a difference between actual frequency signal 48 and command frequency 56, thereby producing command frequency error 52. Command frequency 56 is representative of the local time, that being the error-corrected frequency of digitally-controlled oscillator 62, which can be referred to as the updated local time. Accordingly, command frequency error 52 represents the error-correction that must be applied to digitally-controlled oscillator 62 so that the updated local time matches the time of day (i.e., master clock 14). It is known to those skilled in the control system art that directly feeding an error signal into a feedback control system can result in unstable operation (e.g., overshooting, undershooting, hunting). Therefore, command frequency error 52 is input to PID controller 54 which dampens the aforementioned instability that could otherwise result, thereby establishing stable operation of digitally-controlled oscillator 62. Proportional integral derivative controller 54 can be referred to as a feedback optimizing component. In the illustrated embodiment, PID controller 54 extracts proportional components of command frequency error 52, while also performing integrating (i.e., weighting) and differentiating (i.e., rate) operations on command frequency error 52. In other embodiments, one or more of the proportional, integral, and/or derivative operations can be excluded from the feedback optimizing component. Digitally-controlled oscillator 62, being time synchronized with master clock 14, therefore produces sub-controller time signal 26 (i.e., local time signal). Additional aspects of time synchronization will be described in greater detail later in FIG. 4. As noted earlier, it is to be appreciated that additional circuit components (not shown in FIG. 3) are used for frequency counting to translate sub-controller time signal 26 into the local time signal. Command frequency 56 (i.e., representative of local time) is also provided as an input to command frequency amplifier 58 which provides local time feedback signal 60.

The embodiment shown in FIG. 3 depicts how frequency tuning loop 30 provides time synchronization between sub-controller 20 and master controller 12. Therefore, each sub-controller 20 has a separate frequency tuning loop 30 and associated components as shown in FIG. 3. Time synchronization is also provided from each sub-controller 20 and each associated node 70, with each node having a separate frequency tuning loop 30 and associated components that are substantially similar to those shown in FIG. 3. Because nodes 70 and associated node clocks 74 are in the lowest time synchronization level (i.e., sync level 3), a serial transmitter (e.g., RS-485 transmitter 28) is not necessary at the output of node clocks 74.

Figure 4:
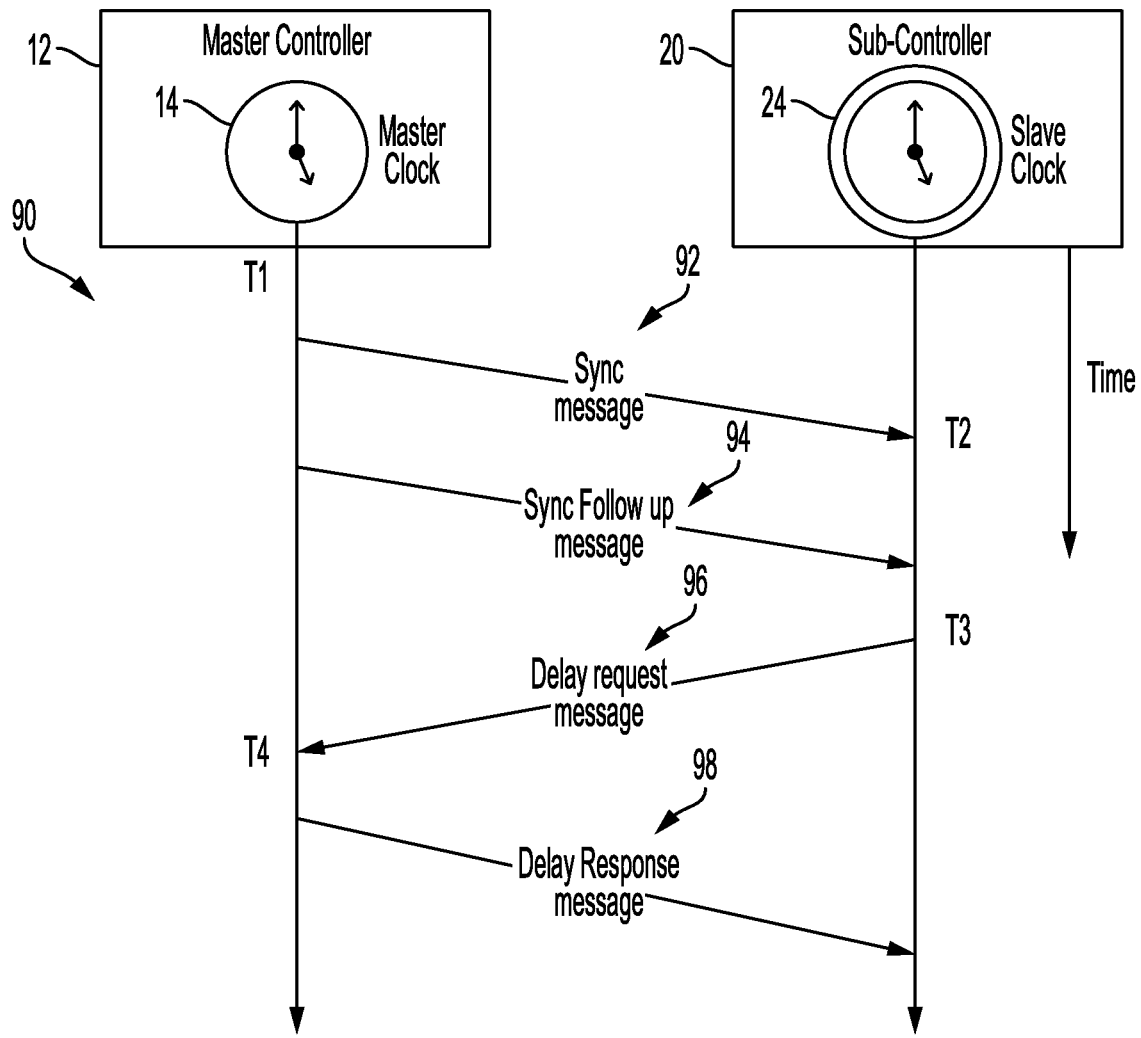
FIG. 4 is a synchronization timing diagram for the smart sensing system shown in FIG. 1.

FIG. 4 is a synchronization timing diagram for smart sensing system 10 shown in FIG. 1. Shown in FIG. 4 are master controller 12, master clock 14, sub-controller 20, sub-controller clock 24, timing diagram 90, sync message 92, sync follow-up message 94, delay request message 96, and delay response message 98. The descriptions of master clock 14 and sub-controller clock 24 are substantially as provided above in regard to FIG. 1. Timing diagram 90 demonstrates how message propagation delays can be determined and corrected for in providing time synchronization between master controller 12 (i.e., master clock 14) and sub-controller 20 (i.e., sub-controller clock 24, slave clock). Sync message 92 is produced by master controller 12 at time T1 and arrives at sub-controller 20 at time T2 as a result of message propagation delay. Sync follow-up message 94 is a second sync message that is produced by master controller 12, arriving at sub-controller 20 at a later time. Sync follow-up message 94 triggers delay request message 96 which is produced by sub-controller 20 at time T3 and propagates to master controller 12, arriving at time T4. In response to receiving delay request message 96, master controller 12 generates delay response message 98, which propagates to sub-controller 20. In the illustrated embodiment, sync message 92, sync follow-up message 94, delay request message 96, and delay response message 98 are transmitted between master controller 12 and sub-controller 20 via serial communication bus 16 (shown in FIGS. 1-2). Timing diagram 90 can be referred to as a precision time protocol. In an exemplary embodiment, the precision time protocol depicted in timing diagram 90 can use the IEEE-1588 standard for precision clock synchronization (i.e., time synchronization). Timing diagram 90 depicted in FIG. 4 is based on the IEEE-1588 Standard (Edition 2.0, 2009-02), published by the Institute of Electrical and Electronics Engineers (IEEE), and is hereby incorporated by reference. In some embodiments, other precision time protocol methods can be used (i.e., other than the IEEE-1588 Standard).

Propagation time delays are a combination of signal propagation along serial communication bus 16 and circuitry processing time. The physical length of a section of serial communication bus 16 determines the signal propagation time therein, and RS-485 receiver 22, RS-485 transmitter 28, and other circuit components are non-limiting examples of circuits that can introduce additional propagation time delays (e.g., circuit switching speeds). Accordingly, the propagation time of sync message 92 can be calculated as (T2−T1), and propagation time of delay request message 96 can be calculated as (T4−T3). In the illustrated embodiment, these propagation time delays are asymmetrical, with (T4−T3) being greater than (T2−T1). Accordingly, an effective propagation delay can be calculated using equation 1.
Equation 1:

$$\text{Effective Propagation Delay} = \frac{[(T4-T3)+(T2-T1)]}{2} \quad \text{Equation 1}$$

A timing offset can then be calculated using equation 2.

$$\text{Timing Offset} = (T2-T1) - \text{Effective Propagation Delay} \quad \text{Equation 2:}$$

By combining Equations 1 and 2, timing offset can be written using equation 3.
Equation 3:

$$\text{Timing Offset} = \frac{[(T2-T1)-(T4-T3)]}{2} \quad \text{Equation 3}$$

Therefore, the value of timing offset is used as time error signal 36 as shown above in regard to FIG. 3.

The exemplary embodiment of timing diagram 90 shown in FIG. 3 was described regarding the time synchronization of a particular sub-controller clock 24 with master clock 14. Timing diagram 90 can also be used to provide time synchronization of a particular node clock 74 with a sub-controller clock 24 in a substantially similar manner. In describing time synchronization between a node clock 74 and a sub-controller clock 24, node clock can be referred to as a local clock or as a slave clock, and sub-controller clock 24 can be referred to as a master clock.

As described above in regard to FIG. 1, sub-controllers 20, nodes 70 can be referred to as being highly-configurable LRUs, and can be added, removed, and/or relocated with a relative amount of ease. An addition or relocation could affect the effective propagation delay and/or timing offset for any particular LRU (e.g., sub-controller 20, node 70). Accordingly, it can be important to determine the values of effective propagation delay and timing offset during the operation of smart sensing system 10. In some embodiments, the values of effective propagation delay and timing offset can be measured periodically during the operation of smart sensing system 10. It is to be appreciated that each interconnection between master controller 12 and each sub-controller 20 has an associated value of effective propagation delay and timing offset. Moreover, time synchronization between each sub-controller 20 and each associated node 70 has an associated value of effective propagation delay and timing offset. Accordingly, values of effective propagation delay and timing offset must be periodically measured for each of the various sub-controllers 20 and nodes 70 in smart sensing system 10. In an exemplary embodiment, the values of effective propagation delay and timing offset can be measured about once per second during the operation of a system of distributed devices (e.g., smart sensing system 10). In other embodiments, the values of effective propagation delay and/or timing offset can be measured at other intervals, either more or less frequently than about once per second. In yet other embodiments, the values of effective propagation delay and/or timing offset can be measured during the initialization (i.e., start-up) of a particular sub-controller 20 and/or node 70. In some embodiments, these values can be measured according to a particular schedule during the operation of a system of distributed devices (e.g., smart sensing system 10).

By using the architecture of smart sensing system 10 having master controller 12 and one or more sub-controllers 20, each having an associated frequency tuning loop 30, serial communication bus 16 can be used to provide highly accurate time-sync of highly-configurable LRUs throughout smart sensing system 10. In the illustrated embodiment, time synchronization can be provided within smart sensing system 10 whereby sub-controller clocks 24 and node clocks 74 are synchronized with master clock 14 within 1 µsec. This can be referred to as sub-microsecond synchronization. In some embodiments, time synchronization can be provided within 100 nsec ($1 \times 10^{-7}$ sec.). In other embodiments, time synchronization can be provided within 10 nsec ($1 \times 10^{-8}$ sec.).

The exemplary embodiment shown and described in FIG. 1 was of a smart sensing system as a family of distributed sensing and processing line replaceable units LRUs. Time synchronization between any two or more distributed electronic devices using a serial communications bus is within the scope of the present disclosure, without regard to the platform, structure, or architecture of the distributed devices. Moreover, the scope of the present disclosure includes all systems of distributed electronic devices regardless of the scalability and/or movability of those components (i.e., including LRU and non-LRU devices).

Discussion of Possible Embodiments

The following are non-exclusive descriptions of possible embodiments of the present invention.

A method of synchronizing a local clock with a master clock using a serial communication bus, the method comprising: receiving, by a serial data interface receiver, a master time signal corresponding to a master clock; generating, by a frequency tuning loop, a time error signal corresponding to a difference between the master time signal and a local time signal; generating, by the frequency tuning loop, an actual frequency signal based on: a base frequency; and the time error signal; producing, by the frequency tuning loop, a command frequency error based on the actual frequency signal and the local time signal; and producing, by the local clock, an updated local time signal based on the command frequency error.

The method of the preceding paragraph can optionally include, additionally and/or alternatively, any one or more of the following features, configurations and/or additional components:

A further embodiment of the foregoing method, further comprising producing, by a time error amplifier, a frequency error signal, wherein the frequency error signal is representative of the time error signal.

A further embodiment of the foregoing method, further comprising producing, by an oscillator, the local time signal, wherein: the oscillator defines an oscillator frequency; and the local time signal is representative of the oscillator frequency.

A further embodiment of the foregoing method, further comprising producing, by a feedback optimizing component, an oscillator control signal, wherein the feedback optimizing component is configured to reduce overshoot and/or undershoot by the oscillator.

A further embodiment of the foregoing method, wherein the feedback optimizing component comprises one or more of: a proportional component, an integrating component, and a differentiating component.

A further embodiment of the foregoing method, wherein the feedback optimizing component comprises a proportional integral derivative controller.

A further embodiment of the foregoing method, wherein the oscillator frequency ranges from 1 MHz-1 GHz.

A further embodiment of the foregoing method, wherein the oscillator frequency ranges from 10 MHz-100 MHz.

A further embodiment of the foregoing method, wherein the oscillator is selected from the group consisting of a digitally-controlled crystal oscillator and a voltage-controlled crystal oscillator.

A further embodiment of the foregoing method, further comprising transmitting, by a serial data interface transmitter, the updated local time signal, wherein the updated local time signal is synchronized with the master time signal.

A further embodiment of the foregoing method, wherein a time-keeping difference between the local clock and the master clock is less than 1 microsecond.

A further embodiment of the foregoing method, wherein the serial communication bus uses a serial communication protocol that is selected from the group consisting of: RS-485, RS-422, RS-232, controller area network (CAN), local interconnect network (LIN), optical link, and wireless link.

A further embodiment of the foregoing method, wherein: the serial communication protocol is RS-485; and the serial data interface receiver is an RS-485 receiver.

A further embodiment of the foregoing method, wherein: the master clock is disposed on a master controller; and the local clock is disposed on a sub-controller.

A system for synchronizing a local clock with a master clock using a serial communication bus, the system comprising: a serial data interface receiver, configured to receive a master time signal corresponding to the master clock; a frequency tuning loop, configured to: generate a time error signal corresponding to a difference between the master time signal and a local time signal; generate an actual frequency signal based on: a base frequency; and the time error signal; produce a command frequency error based on the actual frequency signal and the local time signal; and produce an updated local time signal based on the command frequency error; wherein the updated local time signal is representative of the local clock.

The system of the preceding paragraph can optionally include, additionally and/or alternatively, any one or more of the following features, configurations and/or additional components:

A further embodiment of the foregoing system, wherein a time-keeping difference between the local clock and the master clock is less than 1 microsecond.

A further embodiment of the foregoing system, wherein the time-keeping difference between the local clock and the master clock is less than 100 nanoseconds.

A distributed device network, comprising: a serial communication bus; a master controller; a master clock, disposed on the master controller; and one or more sub-controllers, each comprising: a local clock; a serial data interface receiver, configured to receive a master time signal corresponding to the master clock; a frequency tuning loop, configured to: generate a time error signal corresponding to a difference between the master time signal and a local time signal; generate an actual frequency signal based on: a base frequency; and the time error signal; produce a command frequency error based on the actual frequency signal and the local time signal; and produce an updated local time signal based on the command frequency error; wherein the updated local time signal is representative of the local clock.

The distributed device network of the preceding paragraph can optionally include, additionally and/or alternatively, any one or more of the following features, configurations and/or additional components:

A further embodiment of the foregoing distributed device network, further comprising one or more nodes, each of the one or more nodes comprising a node clock, wherein: each of the one or more nodes is connected to an associated sub-controller by a serial communication bus; and each of the one or more nodes is configured to provide time synchronization between a respective local clock of the associated sub-controller and the respective node clock using the serial communication bus.

A further embodiment of the foregoing distributed device network, wherein the distributed device network is a smart sensing system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of synchronizing a local clock with a master clock using a serial communication bus, the method comprising:
   receiving, by a serial data interface receiver, a master time signal corresponding to a master clock;
   generating, by a frequency tuning loop, a time error signal corresponding to a difference between the master time signal and a local time signal, wherein the time error signal is generated at a predetermined interval;
   generating, by the frequency tuning loop, an actual frequency signal based on:
      a base frequency, the predetermined interval, and the time error signal;
   producing, by the frequency tuning loop, a command frequency error based on the actual frequency signal and the local time signal; and
   producing, by the local clock, an updated local time signal based on the command frequency error.

2. The method of claim 1, further comprising producing, by a time error amplifier, a frequency error signal, wherein the frequency error signal is representative of the time error signal.

3. The method of claim 1, further comprising producing, by an oscillator, the local time signal, wherein:
   the oscillator defines an oscillator frequency; and
   the local time signal is representative of the oscillator frequency.

4. The method of claim 3, further comprising producing, by a feedback optimizing component, an oscillator control signal, wherein the feedback optimizing component is configured to reduce overshoot and/or undershoot by the oscillator.

5. The method of claim 4, wherein the feedback optimizing component comprises one or more of: a proportional component, an integrating component, and a differentiating component.

6. The method of claim 5, wherein the feedback optimizing component comprises a proportional integral derivative controller.

7. The method of claim 3, wherein the oscillator frequency ranges from 1 MHz —1 GHz.

8. The method of claim 7, wherein the oscillator frequency ranges from 10 MHz —100 MHz.

9. The method of claim 3, wherein the oscillator is selected from the group consisting of a digitally-controlled crystal oscillator and a voltage-controlled crystal oscillator.

10. The method of claim 1, further comprising transmitting, by a serial data interface transmitter, the updated local time signal, wherein the updated local time signal is synchronized with the master time signal.

11. The method of claim 1, wherein a time-keeping difference between the local clock and the master clock is less than 1 microsecond.

12. The method of claim 1, wherein the serial communication bus uses a serial communication protocol that is selected from the group consisting of: RS-485, RS-422, RS-232, controller area network (CAN), local interconnect network (LIN), optical link, and wireless link.

13. The method of claim 12, wherein:
the serial communication protocol is RS-485; and
the serial data interface receiver is an RS-485 receiver.

14. The method of claim 1, wherein:
the master clock is disposed on a master controller; and
the local clock is disposed on a sub-controller.

15. A system for synchronizing a local clock with a master clock using a serial communication bus, the system comprising:
a serial data interface receiver, configured to receive a master time signal corresponding to the master clock;
a frequency tuning loop, configured to:
generate a time error signal corresponding to a difference between the master time signal and a local time signal, wherein the time error signal is generated at a predetermined interval;
generate an actual frequency signal based on:
a base frequency, the predetermined interval, and the time error signal;
produce a command frequency error based on the actual frequency signal and the local time signal; and
produce an updated local time signal based on the command frequency error;
wherein the updated local time signal is representative of the local clock.

16. The system of claim 15, wherein a time-keeping difference between the local clock and the master clock is less than 1 microsecond.

17. The system of claim 15, wherein the time-keeping difference between the local clock and the master clock is less than 100 nanoseconds.

18. A distributed device network, comprising:
a serial communication bus;
a master controller;
a master clock, disposed on the master controller; and
one or more sub-controllers, each comprising:
a local clock;
a serial data interface receiver, configured to receive a master time signal corresponding to the master clock;
a frequency tuning loop, configured to:
generate a time error signal corresponding to a difference between the master time signal and a local time signal, wherein the time error signal is generated at a predetermined interval;
generate an actual frequency signal based on:
a base frequency, the predetermined interval, and the time error signal;
produce a command frequency error based on the actual frequency signal and the local time signal; and
produce an updated local time signal based on the command frequency error;
wherein the updated local time signal is representative of the local clock.

19. The distributed device network of claim 18, further comprising one or more nodes, each of the one or more nodes comprising a node clock, wherein:
each of the one or more nodes is connected to an associated sub-controller by a serial communication bus; and
each of the one or more nodes is configured to provide time synchronization between a respective local clock of the associated sub-controller and the respective node clock using the serial communication bus.

20. The distributed device network of claim 19, wherein the distributed device network is a smart sensing system.

* * * * *